United States Patent Office 3,326,966
Patented June 20, 1967

3,326,966
PROCESS FOR THE PREPARATION OF METHYL-
TEREPHTHALIC ACID DIMETHYL- AND TRI-
MELLITIC ACID TRIMETHYL ESTERS
Gustav Renckhoff, Witten (Ruhr), Hans-Leo Huelsmann, Witten-Rudinghausen, and Walter A. S. Rudolph, Witten (Ruhr), Germany, assignors to Chemische Werke Witten G.m.b.H., Witten (Ruhr), Germany
No Drawing. Filed Apr. 22, 1963, Ser. No. 274,776
Claims priority, application Germany, May 25, 1962, C 27,079
10 Claims. (Cl. 260—475)

The present invention relates to a process for the preparation of methylterephthalic acid dimethyl- and trimellitic acid trimethyl esters.

It is known to prepare trimellitic acid trimethyl esters and methyl-benzene dicarboxylic acid dimethyl esters by the oxidation of pseudo-cumene with atmospheric oxygen in the presence of catalysts with the difficultly oxidizable intermediate products of the oxidation being converted to more easily oxidizable methyl esters by esterification with methanol.

Also, U.S. Patent 3,008,983 describes a process by which the oxidation of pseudo-cumene is to be maintained predominantly at the stage of the methylbenzene dicarboxylic acids. A mixture of methylterephthalic acid and 4-methyl-isophthalic acid is thereby obtained; however, an economical separation of this mixture into the components thereof is impossible.

Among the isomeric methylbenzene dicarboxylic acids, the pure methylterephthalic acid is particularly valuable, preferably in the form of its dimethyl ester, for the preparation of polycondensation products. An economical separation of the methylterephthalic acid dimethyl ester from the mixture of isomeric methylbenzene dicarboxylic acid dimethyl esters obtainable as intermediate product in the known process for the oxidation of pseudo-cumene to trimellitic acid is, however, equally impossible.

It has been found, in accordance with the present invention, that pure methylterephthalic acid dimethyl ester and trimellitic acid trimethyl ester may be obtained by first oxidizing 1,3-dimethyl-4-methoxymethylbenzene with oxygen or an oxygen-containing gas in the liquid phase, if desired under pressure, preferably at pressures of from 1 to 10 atmospheres, and advantageously in the presence of generally known oxidation catalysts, at temperatures of from 90 to 200° C., preferably from 120 to 165° C., to 2,4-dimethylbenzoic acid; secondly, oxidizing the 2,4-dimethylbenzoic acid, after esterification to the methyl ester, to a mixture of methylterephthalic acid monomethyl ester and 4-methyl-orthophthalic acid monomethyl ester; thirdly, precipitating from this mixture, after esterification to the dimethyl esters, the methyl-terephthalic acid dimethyl ester in the pure form by the addition of methanol; and finally oxidizing the residue, remaining after separation and distillation of the methanol, to trimellitic acid dimethyl ester which is purified by distillation after esterification with methanol to the trimethyl ester.

Accordingly, the primary object of the present invention is to provide a process which allows the preparation of very pure methylterephthalic acid dimethyl ester and trimellitic acid trimethyl ester in an economically advantageous manner.

Other objects of the present invention will become apparent from the description hereinbelow wherein the examples serve to illustrate the invention without limiting the same.

It is surprising that, in the oxidation of the 1,3-dimethyl-4-methoxymethylbenzene according to the oxidation proposed by the present invention, exclusively the methoxymethyl group is initially affected so that 2,4-dimethyl-benzoic acid is obtained. When the methyl ester thereof is further oxidized, a mixture of appropriate equal parts of methyl-terephthalic acid monomethyl ester and 4-methyl-orthophthalic acid monomethyl ester will be formed from which, after conversion into the dimethyl esters, the methylterephthalic acid dimethyl ester can surprisingly be separated in a purely crystalline form by the addition of methanol, while the easily soluble, low-melting 4-methyl-orthophthalic acid dimethyl ester, together with intermediate products of the oxidation, remains in solution. The further oxidation of this diester fraction yields trimellitic acid dimethyl ester which may be easily further esterified to the trimellitic acid trimethyl ester.

The process according to the present invention may be advantageously simplified by combining several oxidation steps in a single oxidation stage. Thus, the recovery of the methylbenzene dicarboxylic acid fraction may be carried out in a single oxidation stage by jointly subjecting to oxidation 2,4-dimethylbenzoic acid methyl ester, which is prepared by the oxidation of 1,3-dimethyl-4-methoxymethylbenzene and esterification of the resulting acid, and fresh 1,3-dimethyl-4-methoxymethylbenzene. After esterification of the oxidation mixture, the resultant mixture of esters can be separated by distillation into 2,4-dimethyl-benzoic acid ester, which is returned into the oxidation with fresh dimethylmethoxymethylbenzene, and into the methylbenzene dicarboxylic acid ester fraction from which the methylterephthalic acid dimethyl ester is separated by precipitation with methanol, as described hereinabove. Then, the remaining constitutents may be further oxidized to trimellitic acid esters.

The entire process is preferably carried out, however, in a single oxidation stage by oxidizing jointly 1,3-dimethyl-4-methoxymethylbenzene, 2,4-dimethylbenzoic acid methyl ester and the 4-methyl-orthophthalic acid dimethyl ester fraction in the presence of oxidation catalysts with oxygen or an oxygen-containing gas in the liquid phase, if desired under increased pressure, preferably at pressures of from 1 to 10 atmospheres, and at temperatures of from about 90 to 200° C. After esterification of the oxidation mixture with methanol, the distillative separation is carried out to give (1) 2,4-dimethylbenzoic acid methyl ester, which is returned into the oxidation stage with fresh 1,3-dimethyl-4-methoxymethylbenzene, (2) a dicarboxylic acid ester fraction from which the methylterephthalic acid dimethyl ester is precipitated by the addition of methanol, whereupon the remaining 4-methyl-orthophthalic acid dimethyl ester is also returned into the oxidation stage, and lastly (3) pure trimellitic acid trimethyl ester as the third fraction.

As oxidation catalysts, for example, heavy metal salts, such as manganese and cobalt salts, particularly the cobalt salt of fatty acids, may be used.

The 1,3-dimethyl-4-methoxymethylbenzene required as starting material is obtained by the chloromethylation of m-xylene with formaldehyde and hydrochloric acid and reaction of the resulting chloromethylxylene with methanol and an alkali. Also an m-xylene-rich mixture of xylene isomers may be employed especially economically for the preparation thereof since only the m-xylene will enter selectively into reaction during the chloromethylation under mild conditions.

The methylterephthalic acid dimethyl esters and trimellitic acid trimethyl esters prepared according to the process of the present invention are valuable intermediate or starting products for the preparation of synthetic substances and softeners.

Example I (A) 650 parts by weight of 1,3-dimethyl-4-methoxymethylbenzene are oxidized in a vertically-arranged cylindrical oxidizer of glass, which is provided with an air duct at the bottom thereof, in the presence of 0.2% by weight of fatty acid cobalt as catalyst in an air current of 3,000 parts by volume/minute. The exhaust air passes two intensive coolers and a cooling trap connected at the outlet side thereof and is kept at −50° C. After the start of the oxidation at 120° C., the temperature is decreased to 95 to 100° C. After 31 hours, the oxidate has an acid number of 253 and a saponification number of 360. The oxidate is esterified by heating with methanol in an autoclave to 230° C. and the crude ester is distilled in vacuo after distillation of the methanol. After a preliminary run of 30 parts by weight of a mixture of 1,3-dimethyl-4-methoxymethylbenzene and 2,4-dimethylbenzoic acid methyl ester having a B.P.$_{15}$ of up to 115° C., 490 parts by weight of 2,4-dimethylbenzoic acid methyl ester pass over having a B.P.$_{15}$ of from 115 to 120° C., an acid number of 3, and a saponification number of 336 (calculated as 342). 82 parts by weight of higher-boiling compounds distill off at between 120 and 150° C. at 15 torr. 60 parts by weight are obtained as residue. 40 parts by weight of 1,3-dimethyl - 4 - methoxymethyl - benzene are separated from the exhaust air. The yield of 2,4-dimethylbenzoic acid methyl ester amounts to 73.5% of the theoretical, based on the amount of 1,3-dimethyl-4-methoxymethylbenzene reacted.

(B) 483 parts by weight of 2,4-dimethylbenzoic acid methyl ester are oxidized with 0.2% by weight of fatty acid cobalt as catalyst at 130° C. for 48 hours in an air current of 3,000 parts by volume/minute with return of the organic constituents of the separator distillate. The oxidate having an acid number of 212 and a saponification number of 551 is esterified by heating with methanol in an autoclave at 230° C. After distillation of the methanol, the crude ester is distilled in vacuo. After a preliminary run of 119 parts by weight of 2,4-dimethylbenzoic acid methyl ester, 346 parts by weight of a mixture of methylbenzene dicarboxylic acid dimethyl esters are thereby obtained, which mixture boils in the interval of from 145 to 160° C. at 10 torr. 50 parts by weight are yielded as residue. The diester fraction is dissolved with heating in 1.5 times the amount thereof by weight of methanol and methylterephthalic acid dimethyl ester is separated in crystalline form from this solution by cooling to 0° C. Distillation of the crystallizate in vacuo yields 113 parts by weight of pure methylterephthalic acid dimethyl ester having a B.P.$_{10}$ of 156° C., a melting point of 71° C., an acid number of 0, and a saponification number of 539 (calculated as 539). After distillation of the methanol, the methanolic mother liquor leaves behind 230 parts by weight of an oily ester with an acid number of 2.3 and a saponification number of 497 and consisting mainly of 4-methyl-orthophthalic acid dimethyl ester. When taking into account the 2,4-dimethylbenzoic acid methyl ester returned unchanged, the yield of methylbenzene dicarboxylic acid dimethyl esters is 75.0% of the theoretical, and that of methylterephthalic acid dimethyl ester is 24.5% of the theoretical.

(C) 150 parts by weight of the oily secondary constituents remaining behind after the separation of the methylterephthalic acid dimethyl ester, consisting mainly of 4-methyl-orthophthalic acid dimethyl ester, are oxidized, after the addition of 0.2% by weight of fatty acid cobalt, for 42 hours at from 160 to 170° C. in an air current of 3,000 parts by volume/minute. The oxidate having an acid number of 226 and a saponification number of 671 is esterified with methanol in the usual manner, and the ester is distilled in vacuo. After a preliminary run of 54 parts by weight of a mixture of methylbenzene dicarboxylic acid dimethyl esters, which boils at between 150 and 190° C. at 10 torr and which has an acid number of 3 and a saponification number of 530, 86 parts by weight of trimellitic acid trimethyl ester are obtained having a B.P.$_{10}$ of from 190 to 200° C. The acid number of the ester is 4 and the saponification number is 661 (calculated as 667). 16 parts by weight are yielded as residue.

When taking into account the methylbenzene dicarboxylic acid dimethyl ester mixture returned unchanged, the yield of trimellitic acid trimethyl ester is 74.1% of the theoretical.

*Example II*

(A) In a vertically-arranged tubular oxidizer of pure aluminum, provided with an air duct, a cooling system of V4A steel for the exhaust air connected with a separator, and with an absorption vessel connected at the outlet side and charged with active carbon, 40.00 parts by weight of 1,3-dimethyl-4-methoxymethylbenzene are oxidized, after the addition of 0.1% by weight of fatty acid cobalt as catalyst, in an air current of from 75 to 80 parts by volume/minute, whereby an excess pressure of the air of 1.5 atmospheres is maintained for the duration of the oxidation. The temperature is 115 to 120° C. After 14.5 hours, the oxidate has an acid number of 248 and a saponification number of 357. The oxidate is esterfied by heating to 230 ° C. in an autoclave with methanol, and the crude ester is distilled. Thereby there are obtained:

(I) 31.90 parts by weight of a fraction distilling at from 102 to 124° C. at 12 torr, consisting mainly of 2, 4-dimethylbenzoic acid methyl ester (acid number, 4.2, saponification number, 324, calculated as 342).

(II) 5.30 parts by weight of a fraction boiling within 124 to 149° C. at 13 torr and containing 2,4-dimethylbenzoic acid methyl ester, methyl phthalide and methylbenzene dicarboxylic acid dimethyl ester (acid number, 22.6, saponification number, 426) and 3.50 parts by weight of distillation residue having a B.P.$_{13}$ higher than 150° C.

0.90 part by weight of organic constituents are separated from the exhaust air. They are returned to oxidation stage B.

(B) A mixture of 31.90 parts by weight of 2,4-dimethylbenzoic acid methyl ester fraction of stage A, 39.10 parts by weight of fresh 1,3-dimethyl-4-methoxymethylbenzene and 0.90 part by weight of organic constituents of the separator distillate of A is oxidized, after the addition of 0.1% by weight of fatty acid cobalt, in an air current of from 80 to 90 parts by volume/minute under 1.5 atmospheres of pressure at from 130 to 135° C. After 23 hours oxidation time, the oxidate, having an acid number of 276 and a saponification number of 522, is esterified with methanol in an autoclave at from 225 to 230° C. The distillation of the crude ester yields the following fractions:

(I) 13.30 parts by weight of 2,4-dimethylbenzoic acid methyl ester, having a B.P.$_{15}$ of 102 to 130° C. (acid number, 1.1, saponification number, 353)

(II) 50.20 parts by weight of methylbenzene dicarboxylic acid dimethyl ester, having a B.P.$_{10}$ of 130 to 156° C. (acid number, 2.0; saponification number, 507)

(III) 4.50 parts by weight of higher-boiling ester, having a B.P.$_{10}$ of 156 to 172° C. (acid number, 3.1; saponification number, 580) and 11.40 parts by weight of distillation residue having a B.P.$_{10}$ higher than 172° C.

1.00 part by weight of oily compounds are separated from the exhaust air of the oxidizer. They are again employed in the third oxidation.

(C) Recovery of the methylterephthalic acid dimethyl ester:

50.20 parts by weight of methylbenzene dicarboxylic acid dimethyl ester mixture are dissolved while heating in 70 parts by volume of methanol. The solution is cooled to 0° C. Methylterephthalic acid dimethyl ester is thereby precipitated in a crystalline form. The crystals are separated from the mother liquor by centrifuging, washed on the centrifuge with ice-cold methanol and dried. By subsequent distillation of the crystallizate in vacuo, 16.30 parts by weight of colorless, pure methylterephthalic acid dimethyl ester are obtained having a B.P.$_{10}$ of 156° C. The melting point thereof is 71° C. The acid number is 0 and the saponification number is 540, calculated as 539.

(D) The mother liquor remaining behind after crystallization of the methylterephthalic acid dimethyl ester is freed from methanol by distillation, and the residual oily ester mixture consisting mainly of 4-methyl-orthophthalic acid dimethyl ester is further oxidized, together with the organic constituent of the separator distillate B and the fractions A–II and B–III, in the presence of 0.1% by weight of fatty acid cobalt at from 160 to 170° C. in an air current of 90 parts by volume/minute under 1.5 atmospheres of pressure. The acid number of the material employed is 6.2 and the saponification number is 485. After 15 hours of oxidation time, the oxidate has an acid number of 250 and a saponification number of 682. It is esterified, together with the organic constituent of the separator distillate, in an autoclave with methanol at 230° C. The crude ester is distilled in vacuo together with the distillation residues from stages A and B.

Thereby there are obtained:
(I) 17.90 parts by weight of methylbenzene dicarboxylic acid dimethyl ester, boiling interval from 150 to 190° C. at 10 torr (acid number, 2.7; saponification number, 535, calculated as 539)
(II) 37.25 parts by weight of trimellitic acid trimethyl ester, having a B.P.$_{10}$ of 190 to 200° C. (acid number, 3; saponification number, 662, calculated as 667) and 11.35 parts by weight of distillation residue.

From fraction I, another 1.75 parts by weight of pure methylterephthalic acid dimethyl ester are obtained, as described under C. 16.15 parts by weight of an oily ester which remain behind after distillation of the methanol from the mother liquor and consisting essentially of 4-methylorthophthalic acid dimethyl ester, may be returned to oxidation stage D. From the active carbon of the absorption vessel, 0.9 part by weight of 1,3-dimethyl-4-methoxymethylbenzene are recovered.

*Experimental Balance*

Employed materials ____ 78.20 parts by weight of 1,3-dimethyl-4-methoxymethylbenzene.
Products obtained: Yield in percent of theoretical, based on the amount of 1,3-dimethyl-4-methoxymethylbenzene.
(1) End products—
18.05 parts by weight of methylterephthalic acid dimethyl ester _____ 16.7
37.25 parts by weight of trimellitic acid trimethyl ester _____ 28.6
(2) Intermediate products to be returned—
13.30 parts by weight of 2,4-dimethylbenzoic acid methyl ester _____ 15.6
16.15 parts by weight of methylbenzene dicarboxylic acid dimethyl ester _____ 14.9

84.75 parts by weight _____ 75.8

*Example III*

(A) A mixture of 50 parts each of 1,3-dimethyl-4-methoxymethylbenzene, 2,4-dimethylbenzoic acid methyl ester and 4-methyl-orthophthalic acid dimethyl ester is oxidized in an air current of 450 parts by volume/minute in an oxidizer provided with stirrer, air duct, cooling system, separator and low-temperature trap, after the addition of 0.2% by weight of fatty acid cobalt referred to the initial weight of the mixture to be oxidized. The temperature is 130 to 140° C. After an oxidation time of 65 hours, the oxidate (102.7 parts by weight) has an acid number of 216 and a saponification number of 601. 37.7 parts by weight of oily organic compounds are separated from the exhaust air. The oxidate and the organic separator distillate are esterified jointly by heating to 230° C. with methanol in an autoclave. After distillation of the methanol, the crude ester is distilled in vacuo. Thereby there are obtained:
(I) 1.44 parts by weight of a mixture of 1,3-dimethyl-4-methoxymethylbenzene and 2,4-dimethylbenzoic acid methyl ester having a B.P.$_{14}$ of 90 to 110° C. (acid number, 1; saponification number, 228)
(II) 33.3 parts by weight of 2,4-dimethylbenzoic acid methyl ester having a B.P.$_{13}$ of 110 to 146° C. (acid number, 0.8; saponification number, 349, calculated as 342)
(III) 76.4 parts by weight of methylbenzene dicarboxylic acid dimethyl ester mixture having a B.P.$_{13}$ of 148 to 185° C. (acid number, 3; saponification number, 531, calculated as 539)
(IV) 34.4 parts by weight of trimellitic acid trimethyl ester, having a B.P.$_{13}$ of 185 to 200° C. (acid number, 4; saponification number, 662, calculated as 667) and 4.0 parts by weight of residue having a B.P.$_{13}$ over 200° C.

76 parts by weight of methylbenzene dicarboxylic acid dimethyl ester fraction are dissolved while heating in 100 parts by weight of methanol. The solution is cooled to 0° C. Methylterephthalic acid dimethyl ester is thereby yielded in crystalline form. 24 parts by weight of pure methylterephthalic acid dimethyl ester are obtained by distillation in vacuo having the following characteristics:

Acid number _____ 0
Saponification number (calculated as 539) _____ 539
B.P.$_{10}$, ° C. _____ 156
M.P., ° C _____ 71

(B) The distillate fractions A–I, A–II and the oily constituents of A–III, consisting mainly of 4-methyl-orthophthalic acid dimethyl ester, are combined and again oxidized after the addition of 63.3 parts by weight of fresh 1,3-dimethyl-4-methoxymethylbenzene under the same conditions as under A. After an oxidation time of 54 hours, the oxidate (108.3 parts by weight) has an acid number of 226 and a saponification number of 650. 39.7 parts by weight of oily organic compounds are separated from the exhaust air. The oxidate and the oily separator distillate are esterified together by heating to 230° C. with methanol in an autoclave. After distillation of the methanol, the crude ester is distilled in vacuo. Thereby there are obtained:
(I) 2.35 parts by weight of a mixture of 1,3-dimethyl-4-methoxymethylbenzene and 1,4-dimethylbenzoic acid methyl ester having a B.P.$_{16}$ of 90 to 115° C. (acid number, 0.7; saponification number, 312)
(II) 30.5 parts by weight of a fraction consisting mainly of 2,4-dimethylbenzoic acid methyl ester having a B.P.$_{16}$ of 115 to 144° C. (acid number, 0.9; saponification number, 395, calculated as 342)
(III) 78.1 parts by weight of a methylbenzene dicarboxylic acid dimethyl ester fraction having a B.P.$_{16}$ of 147 to 190° C. (acid number, 3; saponification number, 579, calculated as 539)
(IV) 48.2 parts by weight of trimellitic acid trimethyl ester having a B.P.$_{16}$ of 190 to 205° C. (acid number, 4; saponification number, 660, calculated as 667) and 4.0 parts by weight of residue having a B.P.$_{16}$ of over 205° C.

From the distillate fraction III, 25.0 parts by weight of pure methylterephthalic acid dimethyl ester are separated, as described under A. The oily ester remaining behind after the distillation of the solvent from the mother liquor consists essentially of 4-methyl-orthophthalic acid dimethyl ester.

All of the products obtained, with the exception of the desired end products, namely methylterephthalic acid dimethyl ester and trimellitic acid trimethyl ester, may be returned into the oxidiation with fresh 1,3-dimethyl-4-methoxymethylbenzene.

The total yield of valuable esters from A and B (methylterephthalic acid dimethyl ester, trimellitic acid trimethyl ester and ester fractions which may be returned into the oxidation) is 78% of the theoretical.

While the invention has been described with reference to a number of examples thereof, it will be understood that changes may be made in carrying out the process without departing from the scope of the invention, and it is intended that all matter contained in the above description shall be interpreted as illustrative and not in a limiting sense.

We claim:

1. A process for the preparation of methylterephthalic acid dimethyl ester and trimellitic acid trimethyl ester which comprises oxidizing 1,3-dimethyl-4-methoxymethylbenzene in the liquid phase by passing oxygen or an oxygen-containing gas therethrough in the presence of an oxidation catalyst at a temperature of between approximately 90° and 200° C., esterifying the resulting 2,4-dimethylbenzoic acid with methanol and further oxidizing the resulting 2,4-dimethylbenzoic acid methyl ester, esterifying the resulting mixture of methylbenzene dicarboxylic acid monomethyl esters with methanol to form a mixture consisting essentially of methylterephthalic acid dimethyl ester and 4-methylorthophthalic acid dimethyl ester, precipitating pure crystalline methylterephthalic acid dimethyl ester by the addition of methanol to said latter mixture, further oxidizing the precipitation residue remaining after said precipitation step to trimellitic acid dimethyl ester, and thereafter esterifying the latter dimethyl ester with methanol to trimellitic acid trimethyl ester.

2. A process as defined in claim 1, wherein the first oxidation step is carried out under a pressure of between approximately 1 and 10 atmospheres.

3. A process as defined in claim 1, wherein said temperature is between 120° and 165° C.

4. A process as defined in claim 1, wherein said oxidation catalyst is a manganese or cobalt fatty acid salt.

5. A process for the preparation of methylterephthalic acid dimethyl ester and trimellitic acid trimethyl ester which comprises oxidizing a mixture of approximately equal amounts by weight of 1,3-dimethyl-4-methoxymethylbenzene and 2,4-dimethylbenzoic acid methyl ester in the liquid phase with oxygen or an oxygen-containing gas in the presence of an oxidation catalyst at a temperature of between approximately 90° and 200° C., esterifying the resultant oxidation mixture with methanol, distilling the resultant mixture of esters of give 2,4-dimethylbenzoic acid methyl ester and a mixture of 4-methyl-orthophthalic acid dimethyl ester and methylterephthalic acid dimethyl ester, returning said 2,4-dimethylbenzoic acid methyl ester to said oxidation step, precipitating methylterephthalic acid dimethyl ester by the addition of methanol to said mixture of esters, and further oxidizing and then esterifying with methanol the 4-methyl-orthophthalic acid dimethyl ester remaining after said precipitation step to give trimellitic acid trimethyl ester.

6. A process as defined in claim 5, wherein said temperature is between 120° and 165° C.

7. A process as defined in claim 6, wherein the first oxidation step is carried out under a pressure of between approximately 1 and 10 atmospheres.

8. A process for the preparation of methylterephthalic acid dimethyl ester and trimellitic acid trimethyl ester which comprises oxidizing a mixture of 1,3-dimethyl-4-methoxymethylbenzene, 2,4-dimethylbenzoic acid methyl ester and 4-methyl-orthophthalic acid dimethyl ester in the liquid phase with oxygen or an oxygen-containing gas in the presence of an oxidation catalyst at a temperature of between approximately 90° and 200° C., esterfying the resultant oxidation mixture with methanol, separating the resultant methyl esters by distillation into 2,4-dimethylbenzoic acid methyl ester, trimellitic acid trimethyl ester and a dicarboxylic acid dimethyl ester fraction, precipitating methylterephthalic acid dimethyl ester from said ester fraction by the addition of methanol thereto, and returning said 2,4-dimethylbenzoic acid methyl ester and the dicarboxylic acid dimethyl ester constituent remaining after the precipitation step together with fresh 1,3-dimethyl-4-methoxymethylbenzene into said oxidation step.

9. A process as defined in claim 8, wherein said temperature is between 120° and 165° C.

10. A process as defined in claim 9, wherein the first oxidation step is carried out under a pressure of between approximately 1 and 10 atmospheres.

References Cited

UNITED STATES PATENTS

| | | | |
|---|---|---|---|
| 2,653,165 | 9/1953 | Levine | 260—524 |
| 2,880,237 | 3/1959 | Knobloch | 260—475 |
| 3,068,280 | 12/1962 | Katzschmann | 260—523 |

LORRAINE A. WEINBERGER, *Primary Examiner.*

THOMAS L. GALLOWAY, JR., *Assistant Examiner.*